UNITED STATES PATENT OFFICE.

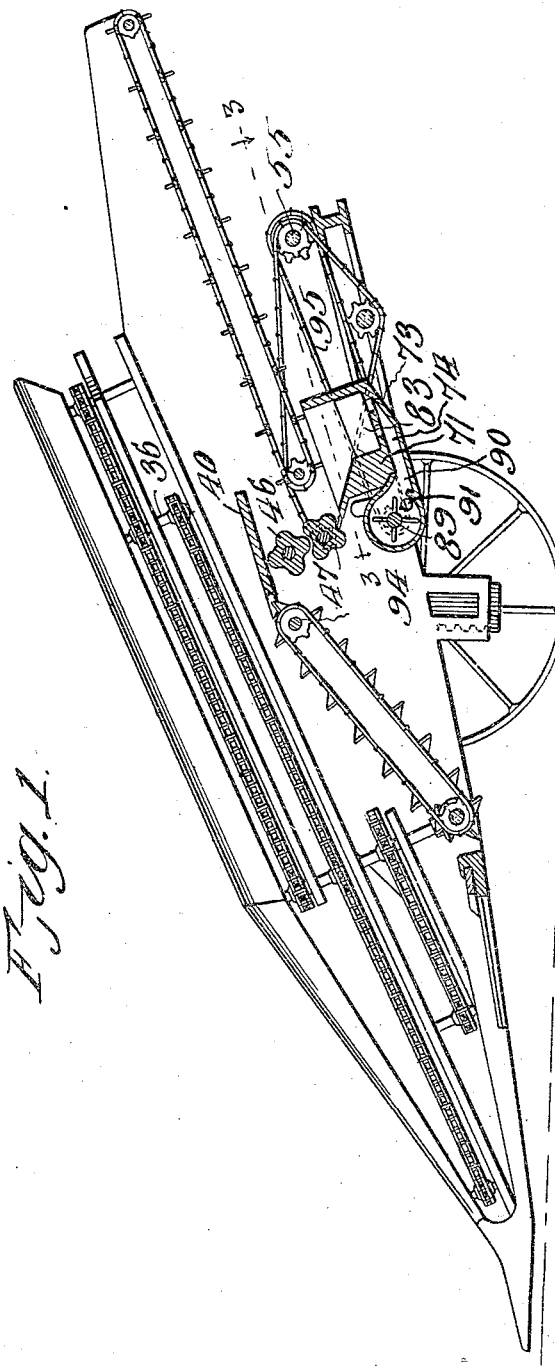

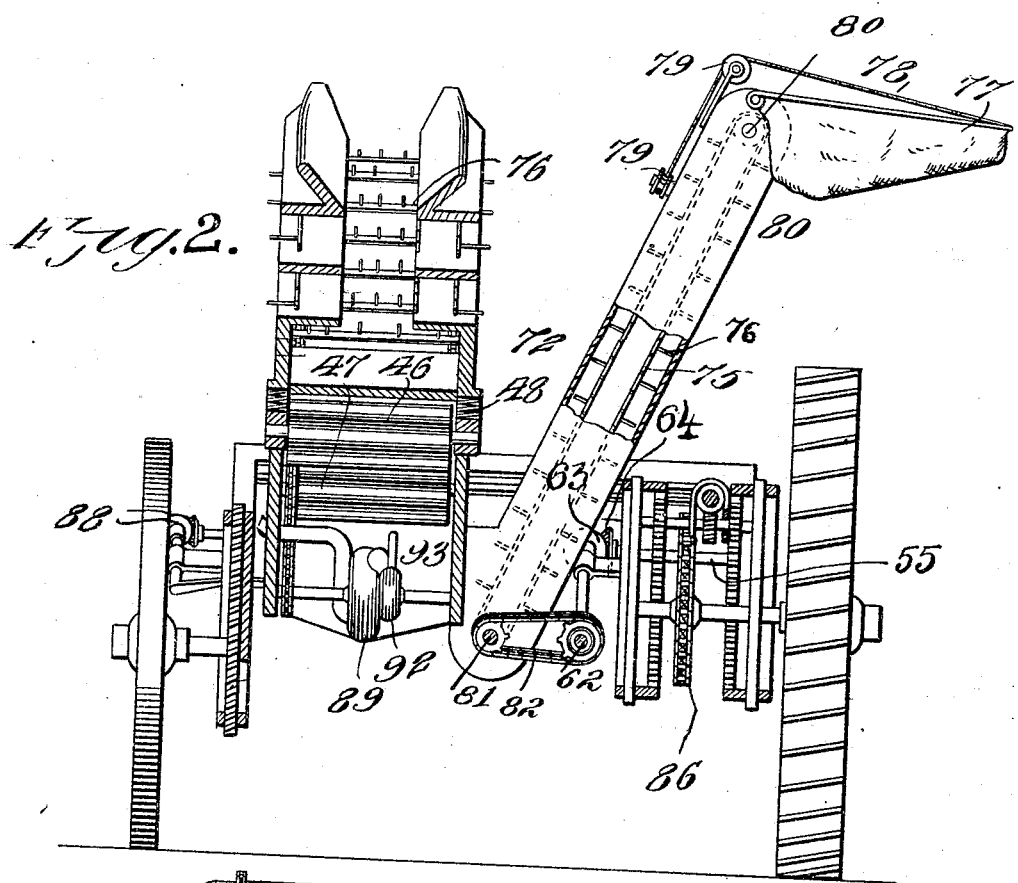

DICKSON B. RAWORTH, OF BROWNSVILLE, TENNESSEE.

CLEANER AND SEPARATOR FOR SHELLED CORN.

959,260.      Specification of Letters Patent.      Patented May 24, 1910.

Application filed December 18, 1909. Serial No. 533,904.

*To all whom it may concern:*

Be it known that I, DICKSON B. RAWORTH, a citizen of the United States, residing at Brownsville, in the county of Haywood and State of Tennessee, have invented new and useful Improvements in Cleaners and Separators for Shelled Corn, of which the following is a specification.

This invention relates to cleaners and separators for shelled corn, the present application being a division of my prior application filed Aug. 16, 1909, Serial No. 513,212, for corn harvesters, wherein I have shown a machine for cutting the standing stalks, separating the ears therefrom, depositing the stripped stalks upon the ground, and separating the ears and corn which may be shelled therefrom and delivering the same into separate receptacles.

The object of the present invention is to provide novel means for recovering, cleaning and separating the shelled corn from dust and other foreign substances and delivering the same into a separate receptacle from the ears, so as to prevent the loss of such corn and discharge it in marketable condition.

A still further object of the invention is to provide means for temporarily preventing discharge of the ear corn from its delivery elevator or conveyer at times as at the end of rows, when a wagon employed as a receiver cannot conveniently follow the path of the machine.

In my aforesaid application, I have claimed the construction of my improved corn harvester mechanism. The claims of the present application are directed to means for treating the corn after it has been harvested.

The invention consists of the features of construction, combination and arrangement of parts hereinafter more fully described and claimed, reference being had to the accompanying drawing, in which:—

Figure 1 is a central, vertical longitudinal section of a corn harvester embodying my invention. Fig. 2 is a vertical transverse section of the same. Fig. 3 is a fragmentary horizontal section on the line 3—3 of Fig. 1.

Referring to the drawings, 46 and 47 designate snapping rolls which remove the ears of corn from the stalks fed thereto by the gathering mechanism of the harvester. These rolls are driven in a suitable manner from a drive shaft 55, from which shaft a transmission shaft 62 is driven by intermeshing gears 63 and 64.

Arranged below and in rear of the snapping rolls is a transverse separating chamber or casing 71 having a flaring or funnel shaped mouth into which the ears separated from the stalks by the rolls fall and pass by gravity into the bottom of the casing which serves as a channel communicating at one end with the lower end of an inclined conveyer pipe or casing 72 through which the ears are discharged from the machine. The bottom of this channel is formed by a slotted wall or screen 73 forming a partition between the channel and a duct or passage 74.

Arranged within the casing 72 is an endless flexible delivery conveyer 75 provided with cross slats 76 to engage the ears of corn and carry them to the upper end of said casing from which they discharge into a pivoted flexible spout 77 which when in lowered position permits the ears to drop therefrom into the body of a receiving wagon driven parallel with the stubble side of the machine. The spout is supported and may be raised or lowered by means of a rope or cable 78 connected at one end thereto and passing forwardly over guide pulleys 79 to a position adjacent the driver's seat, at which point the free end of said cable may be secured to a suitable portion of the frame so that it may be manipulated by the driver to raise and lower the spout as occasion requires. By elevating the spout the discharge of the ears therefrom may be temporarily arrested when the machine is turning around at the ends of rows or traveling at points where it cannot be conveniently followed by the receiving wagon. The conveyer 75 passes around sprockets on upper and lower shafts 80 and 81 journaled on the casing 72, the shaft 81 being connected with and driven from the shaft 62 by a sprocket chain 82.

In the action of the snapping rolls some of the kernels of corn may be shelled from the ears, which may be also partially husked and the loose kernels and separated portions of the husks will fall with the ears into the casing 71. The ears and separated portions of the husks are discharged from the separating chamber or casing onto the lower end of the slatted delivery conveyer 75 through the action of a reciprocating discharge device or plunger 83 having an outwardly extending sliding stem 84 projecting from the end of the casing opposite the delivery conveyer and connected by a pitman rod 85 with a crank 86 on a shaft 87 connected with the shaft 55 by intermeshing beveled gears 88. Through the agitative action of this plunger, the kernels are loosened up and separated from the ears and husks and dropped through the screen bottom 73 into the channel 74 which communicates with an exhaust or suction fan 89 through a duct 90, whereby the kernels will be drawn into the fan casing and discharge through a nozzle 91, to which a bag or other receptacle may be secured to receive the discharging grain. If desired, a blast fan or blower 92 having an outlet 93 may be provided to force a blast of air over or under the screen 73 to further increase the separating action and to cleanse the kernels of corn of dust and other impurities. The blower fans are mounted upon a common shaft 94 driven from the shaft 55 by a sprocket chain 95.

It will be understood that in the operation of the machine the gathered stalks will be cut and conveyed in an efficient manner to the snapping rolls, which will remove the ears therefrom and discharge the stalks upon the ground, and that the ears with any particles of the husks and kernels of corn which may be separated therefrom by the rolls will pass into a separating chamber from which the ears will be discharged in one direction and the loose kernels in another direction into separate receptacles, the loose kernels of corn being cleansed so that they will be discharged in marketable condition. It will also be seen that a simple construction of parts is provided for effecting these results, and that the machine may be readily and conveniently adjusted as occasion requires to suit the character of the ground or the corn which is being harvested in order that the corn may be gathered in a rapid and efficient manner and without liability of crushing or injuring the ears.

I claim:—

1. An apparatus of the character described comprising a receptacle having a screen bottom and a duct communicating therewith through said screen bottom, corn ear outlet communicating with said receptacle, a plunger movable over said screen bottom to discharge the corn ear into said outlet and free the shelled corn for passage through said screen bottom into said duct, and a shelled corn delivery device leading from said duct.

2. In an apparatus for treating corn after separation of the ears from the stalks, a receptacle adapted to receive the separated ears and the corn shelled therefrom, a conveyer for the corn ear leading from said receptacle, a screen within said receptacle, a shelled corn discharging device communicating with the receptacle through the screen, and a combined agitator and ear discharging device movable in said receptacle above the screen.

3. An apparatus of the character described comprising a receptacle for ears of corn and grains shelled therefrom, said receptacle having a screen bottom and a duct communicating therewith through said screen bottom, a corn ear conveyer leading from said receptacle, a plunger movable within the receptacle for forcing the ears of corn to said conveyer and to free the shelled corn to permit the same to drop through the screen bottom into the duct, and a suction device communicating with the duct for the discharge of the shelled corn.

4. An apparatus of the character described comprising a receptacle for ear and shelled corn, said receptacle being provided with a screen bottom and a duct communicating therewith through said screen bottom, a corn ear conveyer communicating with the receptacle, a plunger movable within the receptacle for feeding the corn ear to said conveyer and freeing the shelled corn for discharge through said screen bottom into said duct, means for delivering a blast of air through the screen bottom for loosening up the mass within the receptacle, and a shelled corn discharge device leading from the duct.

In testimony whereof I affix my signature in presence of two witnesses.

DICKSON B. RAWORTH.

Witnesses:
T. O. HOLLOWAY, Jr.,
J. H. KING.